United States Patent
Maekawa

(10) Patent No.: US 9,683,706 B2
(45) Date of Patent: Jun. 20, 2017

(54) CYLINDER VALVE

(71) Applicant: NERIKI VALVE CO., LTD., Hyogo (JP)

(72) Inventor: Shinji Maekawa, Hyogo (JP)

(73) Assignee: NERIKI VALVE CO., LTD., Hyogo (JP)

( * ) Notice: Subject to any disclaimer, the term of this patent is extended or adjusted under 35 U.S.C. 154(b) by 0 days.

(21) Appl. No.: 14/973,763

(22) Filed: Dec. 18, 2015

(65) Prior Publication Data

US 2016/0356426 A1    Dec. 8, 2016

Related U.S. Application Data

(63) Continuation of application No. PCT/JP2015/065925, filed on Jun. 2, 2015.

(51) Int. Cl.
*F17C 13/04* (2006.01)
*G05D 16/10* (2006.01)

(52) U.S. Cl.
CPC ........... *F17C 13/04* (2013.01); *G05D 16/106* (2013.01)

(58) Field of Classification Search
CPC ............................... F17C 13/04; G05D 16/06
USPC ............................................. 137/613, 614.2
See application file for complete search history.

(56) References Cited

U.S. PATENT DOCUMENTS 4,372,343 A * 2/1983 Trinkwalder, Jr. ...... F17C 13/04
  137/493
6,293,307 B1 * 9/2001 Oi et al. .................. F16K 1/305
  137/460

FOREIGN PATENT DOCUMENTS

JP      2821699 B2    11/1998
JP      2004-92712 A   3/2004
JP      2005-201404 A  7/2005

OTHER PUBLICATIONS

International Search Report issued in Application No. PCT/JP2015/065925, mailed on Sep. 1, 2015 (2 pages).

* cited by examiner

*Primary Examiner* — Kevin Lee
(74) *Attorney, Agent, or Firm* — Nakanishi IP Associates, LLC

(57) ABSTRACT

Provided is a Cylinder Valve capable of switching a fluid sealing state to a fluid releasing state or vice versa with certainty and also capable of preventing a flow noise from being caused when the fluid is released. A Cylinder Valve— includes a Residual pressure Valve mechanism located in a Residual pressure Valve mechanism insertion space formed in a flow path. The Residual pressure Valve mechanism includes a valve that is located in the Residual pressure Valve mechanism insertion space so as to freely advance or retract to a valve close position or a valve open position and retracts toward the valve open position by a pressure of gas flowing in the flow path; a forward convex portion located at a tip of the valve; a coil spring that urges the valve in a direction in which the valve advances from the valve open position toward the valve close position; and a seal seat and a pressing portion that retain the O-ring while exposing a contact permission portion that allows the forward convex portion to be in contact therewith. The seal seat and the pressing portion are secured to an outlet.

4 Claims, 7 Drawing Sheets

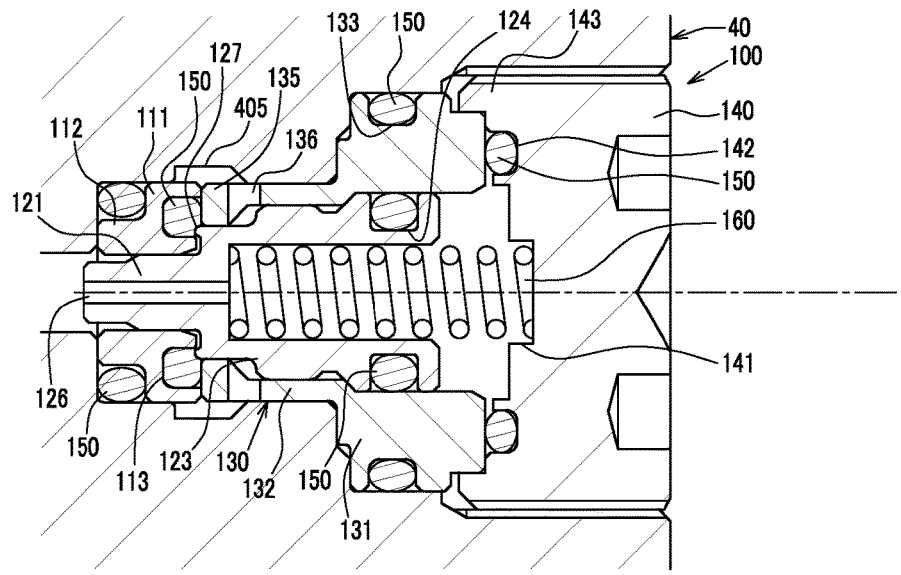
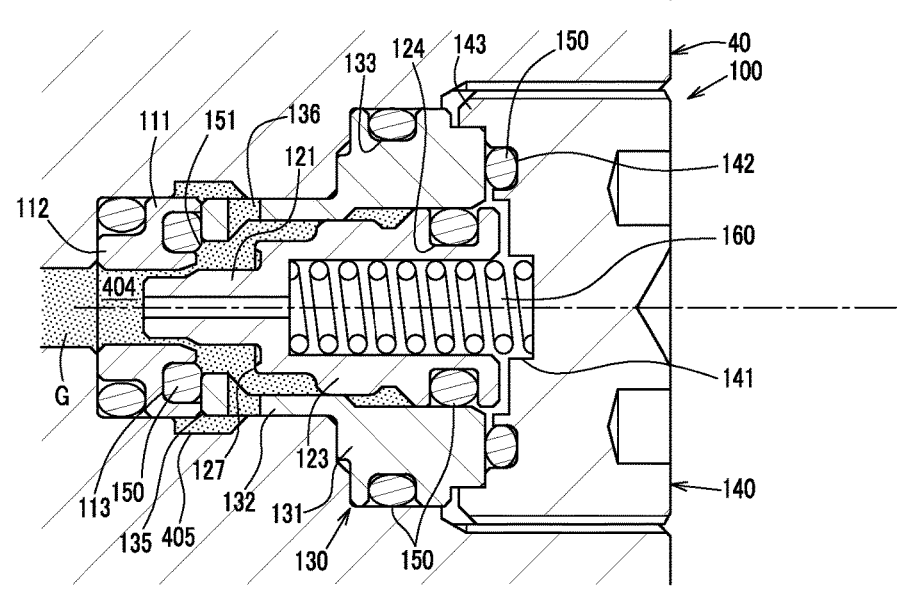

CYLINDER VALVE

CROSS-REFERENCE TO RELATED APPLICATION

This application is a continuation of an International Application No. PCT/JP2015/065925 filed on Jun. 2, 2015, the entire contents of which are incorporated herein by reference.

TECHNICAL FIELD

The present invention relates to a Cylinder Valve including a flow direction restriction valve mechanism that, for example, allows gas of a predetermined pressure to remain in a Gas Cylinder, such as a so-called Residual pressure Valve mechanism or the like.

BACKGROUND ART

Generally in a valve device including an open/close valve that allows a fluid such as gas or the like to flow and also switches an open state to a sealed state or vice versa, a flow direction restriction valve mechanism may be occasionally provided. The flow direction restriction valve mechanism such as, for example, a so-called Residual pressure Valve mechanism or the like is different from the open/close valve, and restricts the flow direction of the fluid and allows gas of a predetermined pressure to remain in a Gas Cylinder (see Patent Document 1).

As shown in Patent Document 1, such a flow direction restriction valve mechanism includes a valve that is located so as to freely advance or retract to a valve open position or a valve close position and retracts toward the valve open position by a pressure of the fluid flowing in a flow path. The flow direction restriction valve mechanism also includes O-rings located at a plurality of positions. The valve advances or retracts while the air-tightness is increased, and thus the flow direction of the fluid is restricted.

Today, Cylinder Valves are diversified and are used in various environments. In such a situation, it is desired that the fluid be released with certainty and that a flow noise caused by the flow of the fluid, which is not conventionally a problem, be solved.

CITATION LIST

Patent Literature

[Patent Document 1] Japanese Laid-Open Patent Publication No. 2005-201404

SUMMARY OF INVENTION

Technical Problem

The present invention has an object of providing a valve container capable of switching a fluid sealing state to a fluid releasing state or vice versa with certainty and also capable of preventing a flow noise from being caused when the fluid is released.

Solution to Problem

The present invention is directed to a Cylinder Valve, including a container attachment portion that attaches a valve to a Gas Cylinder that allows a fluid to be stored therein; a fluid inlet/outlet that allows the fluid to flow to, and from, the valve; a flow path that extends from the container attachment portion to the fluid inlet/outlet and being open at both of ends thereof to allow the fluid to flow therethrough; and an open/close valve that switches an open state to a close state or from the close state to the open state at an intermediate portion of the flow path. A flow direction restriction valve mechanism that prevents the fluid, flowing in the flow path in a releasing direction, from flowing in an unintended direction is attached in a restriction valve attachment space formed in the flow path. The flow direction restriction valve mechanism includes a flow direction restriction valve that is located in the restriction valve attachment space so as to freely advance or retract to a valve open position or a valve close position and retracts toward the valve open position by a pressure of the fluid flowing in the flow path; an urging member that urges the flow direction restriction valve to advance from the valve open position toward the valve close position; an elastic sealing member that contacts a tip contact portion, located at a tip of the flow direction restriction valve located at the valve close position, in a direction in which the flow direction restriction valve advances and retracts to provide sealing; and a sealing member retaining portion that retains the sealing member while exposing at least a contact permission portion of the sealing member, the contact permission portion permitting the tip contact portion to be in contact therewith. The sealing member retaining portion is provided on the valve.

The "fluid" may be a gas, a liquid or a gel.

The "flow direction restriction valve mechanism" may be a valve mechanism, such as, for example, a Residual pressure Valve mechanism or a check valve mechanism, that includes a valve located so as to freely advance or retract to a valve close position or a valve open position in order to restrict the flow direction.

The "sealing member" may be sealing and elastic member such as an O-ring, a rubber seal, a metal seal or the like.

The "sealing member retaining portion provided on the valve" may be a sealing member retaining portion formed of a separate member secured to the valve, or a sealing member retaining portion integrated with a part of the valve. Namely, the sealing member retaining portion is provided directly or indirectly to the valve, which is secured as opposed to the flow direction restriction valve, which is movable. Therefore, the sealing member is assembled to the valve, which is secured.

According to the present invention, a fluid sealing state is switched to a fluid releasing state or vice versa with certainty, and a fluid flow noise is prevented from being caused when the fluid is released.

This will be described in more detail. The Cylinder Valve includes a container attachment portion that attaches a valve to a Gas Cylinder that allows a fluid to be stored therein; a fluid inlet/outlet that allows the fluid to flow to, and from, the valve; a flow path that extends from the container attachment portion to the fluid inlet/outlet and being open at both of ends thereof to allow the fluid to flow therethrough; and an open/close valve that switches an open state to a close state or from the close state to the open state at an intermediate portion of the flow path. A flow direction restriction valve mechanism that prevents the fluid, flowing in the flow path in a releasing direction, from flowing in an unintended direction is attached in a restriction valve attachment space formed in the flow path. The flow direction restriction valve mechanism includes a flow direction restriction valve that is located in the restriction valve attachment space so as to freely advance or retract to a valve open position or a valve close position and retracts toward the valve open position by a pressure of the fluid flowing in the flow path; an urging member that urges the flow direction restriction valve to advance from the valve open position toward the valve close position; an elastic sealing member that contacts a tip contact portion, located at a tip of the flow direction restriction valve located at the valve close position, in a direction in which the flow direction restriction valve advances and retracts to provide sealing; and a sealing member retaining portion that retains the sealing member. Therefore, a fluid sealing state is switched to a fluid releasing state or vice versa with certainty by the switching of the open/close valve and the flow direction restriction valve mechanism.

In a conventional structure, the fluid flow noise is caused by the sealing member, provided on a valve located at the valve open position, vibrating by the flow of the fluid to cause resonation or coming off from a predetermined position by blow-down. According to the present invention, the sealing member retaining portion that retains the sealing member while exposing at least the contact permission portion that allows the tip contact portion to be in contact therewith is provided on the valve. Namely, the sealing member is secured to the valve, which is secured. Therefore, the sealing member retained by the sealing member retaining portion is prevented from vibrating by the flow of the fluid to cause resonance or is prevented from coming off by blow-down. Thus, the fluid flow noise is prevented from being caused.

In an embodiment of the present invention, the sealing member may be formed of an elastic ring; and the sealing member retaining portion may restrict a diametrically inner portion, a diametrically outer portion, a portion opposite to a portion facing the tip contact portion, and a diametrically outer portion of the portion facing the tip contact portion of a cross-section of the elastic ring.

The elastic ring may be a so-called O-ring, a ring having, for example, an elliptical cross-section, namely, having a non-circular cross-section, a ring provided with a lip or the like.

According to the present invention, even in the case where the sealing member is an elastic ring, the sealing member retaining portion restricts the diametrically inner portion, the diametrically outer portion, the portion opposite to the portion facing the tip contact portion, and the diametrically outer portion of the portion facing the tip contact portion of the ring. Therefore, the sealing member retained by the sealing member retaining portion is prevented from vibrating by the flow of the fluid to cause resonance or is prevented from coming off by blow-down. Thus, the fluid flow noise is prevented from being caused with more certainty.

In an embodiment of the present invention, the sealing member retaining portion may include a pressing member that presses the sealing member in a contact direction in which the tip contact portion contacts the contact permission portion.

According to the present invention, the sealing member retained by the sealing member retaining portion is pressed by the pressing member in a direction in which the tip contact portion contacts the contact permission portion. Namely, a pre-stress acts on the sealing member, which is elastic, by the pressing force of the pressing member. Therefore, even if a force acts, by the flow of the fluid, in an opposite direction to the pressing direction of the pressing member, the sealing member retained by the sealing member retaining portion is prevented from vibrating by the flow of the fluid to cause resonance or is prevented from coming off by blow-down. Thus, the fluid flow noise is prevented from being caused with more certainty.

In an embodiment of the present invention, the flow path may include a primary-side flow path from the container attachment portion to a valve chamber that accommodates the open/close valve and a secondary-side flow path from the valve chamber to the fluid inlet/outlet; the restriction valve attachment space may be provided in the secondary-side flow path; and the sealing member retaining portion that retains the sealing member may be located so as to protrude onto a shortest flow path for the fluid flowing in the secondary-side flow path via the restriction valve attachment space.

According to the present invention, in the state where the open/close valve is put into an open state to permit the fluid to flow to the secondary-side flow path, the flow direction restriction valve mechanism attached in the restriction valve attachment space restricts the flow direction of the fluid to prevent the fluid flow noise from being caused with more certainty. This will be described in more detail. In the case where the restriction valve attachment space is formed in the secondary-side flow path in communication with the fluid inlet/outlet of an outlet or the like, there is an undesirable possibility that the flow noise caused by the fluid flowing in a flow direction restriction valve mechanism is heard well. However, in the case where the flow direction restriction valve mechanism having the above-described structure is attached, the flow noise is prevented with more certainty from being caused by the flow of the fluid.

In an embodiment of the present invention, the urging member may have a spring strength that is sufficient to move the flow direction restriction valve to the valve close position against a predetermined pressure of the fluid residual in the cylinder container when the fluid is released through the flow path.

According to the present invention, the fluid provided to fill the Gas Cylinder is not entirely released, and the fluid of a predetermined pressure is left in the Gas Cylinder. Since the fluid of the predetermined pressure remains, the predetermined pressure acts in the Gas Cylinder by the residual fluid. This prevents an unintended flow of the fluid into the Gas Cylinder.

Advantageous Effects of Invention

The present invention provides a valve container capable of switching a fluid sealing state to a fluid releasing state or vice versa with certainty and also capable of preventing a flow noise from being caused when the fluid is released.

BRIEF DESCRIPTION OF DRAWINGS

[FIGS. 5(A) and 5(B)] FIGS. 5(A) and 5(B) illustrate the Residual pressure Valve mechanism.

DESCRIPTION OF EMBODIMENTS

A Cylinder Valve in an embodiment according to the present invention will be described with reference to FIG. 1 through FIGS. 5(A) and 5(B).

Figure 1:
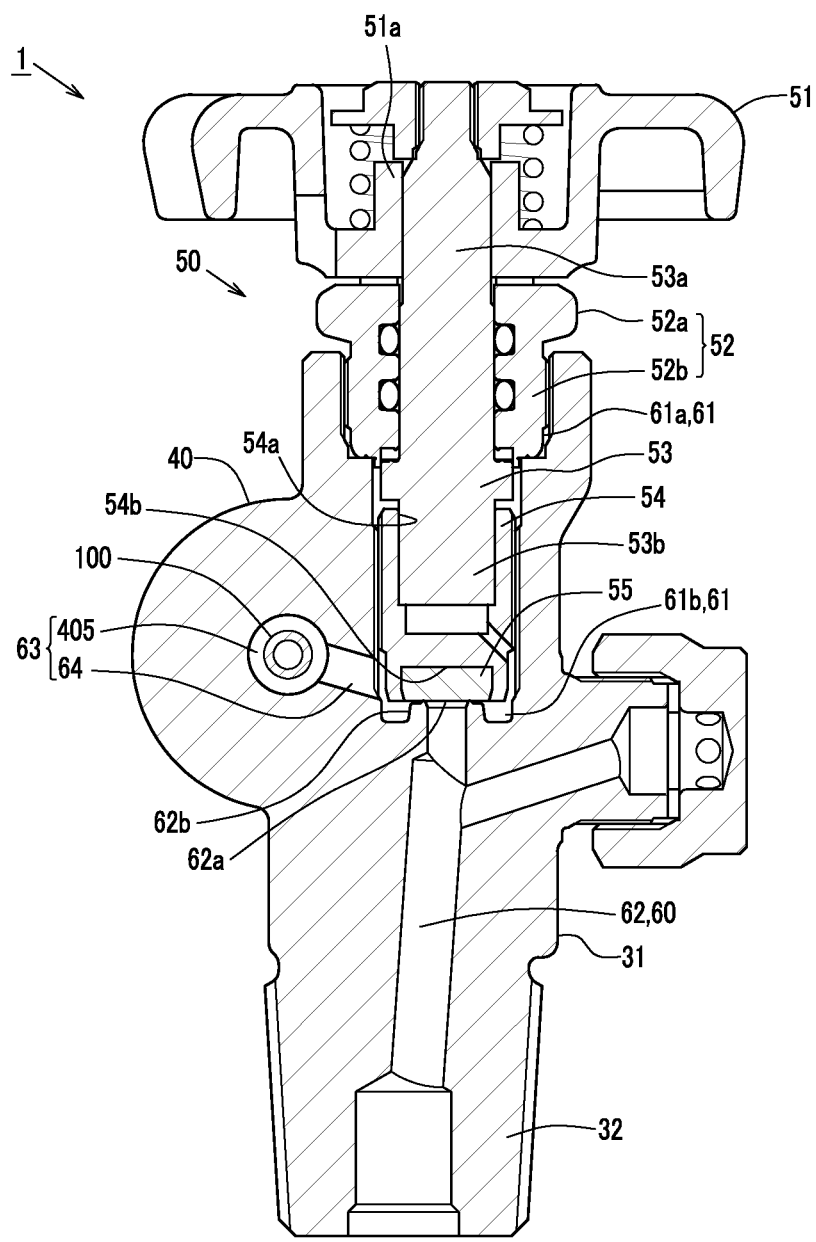
FIG. 1 is a cross-sectional view of a Cylinder Valve.
Figure 2:
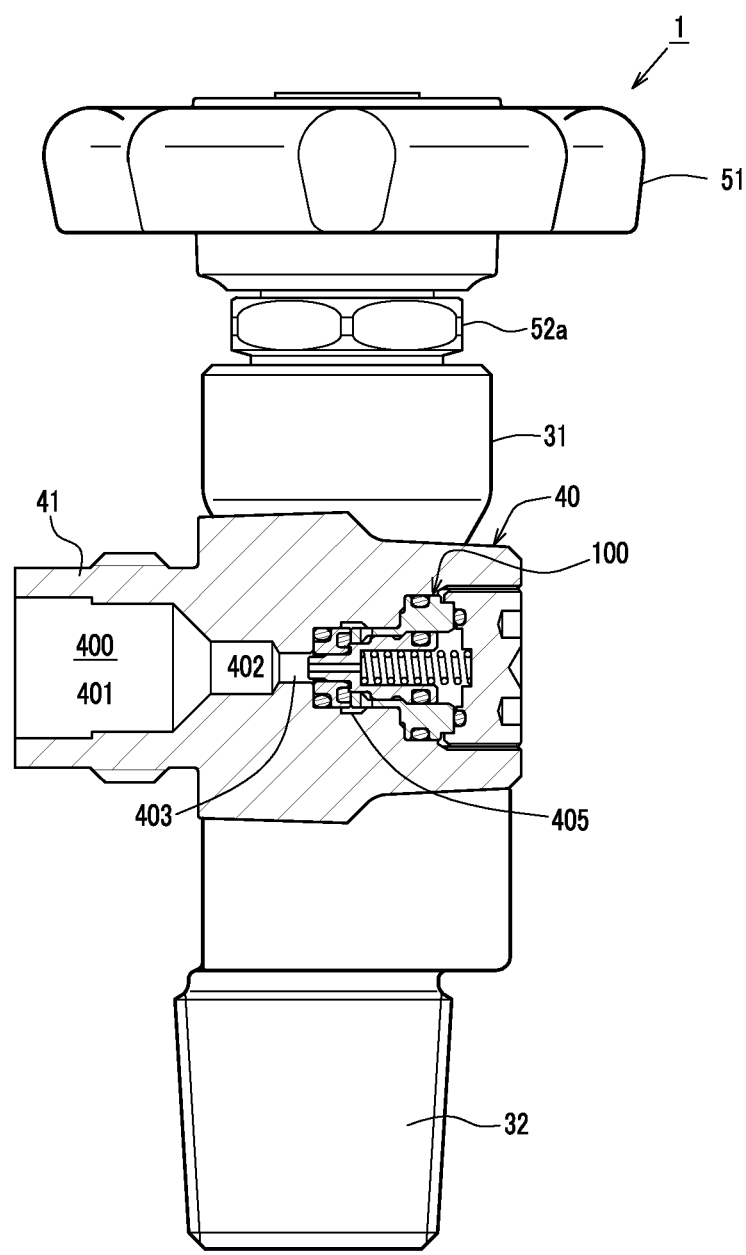
FIG. 2 shows a cross-section of a Residual pressure Valve mechanism in the Cylinder Valve.
Figure 3:
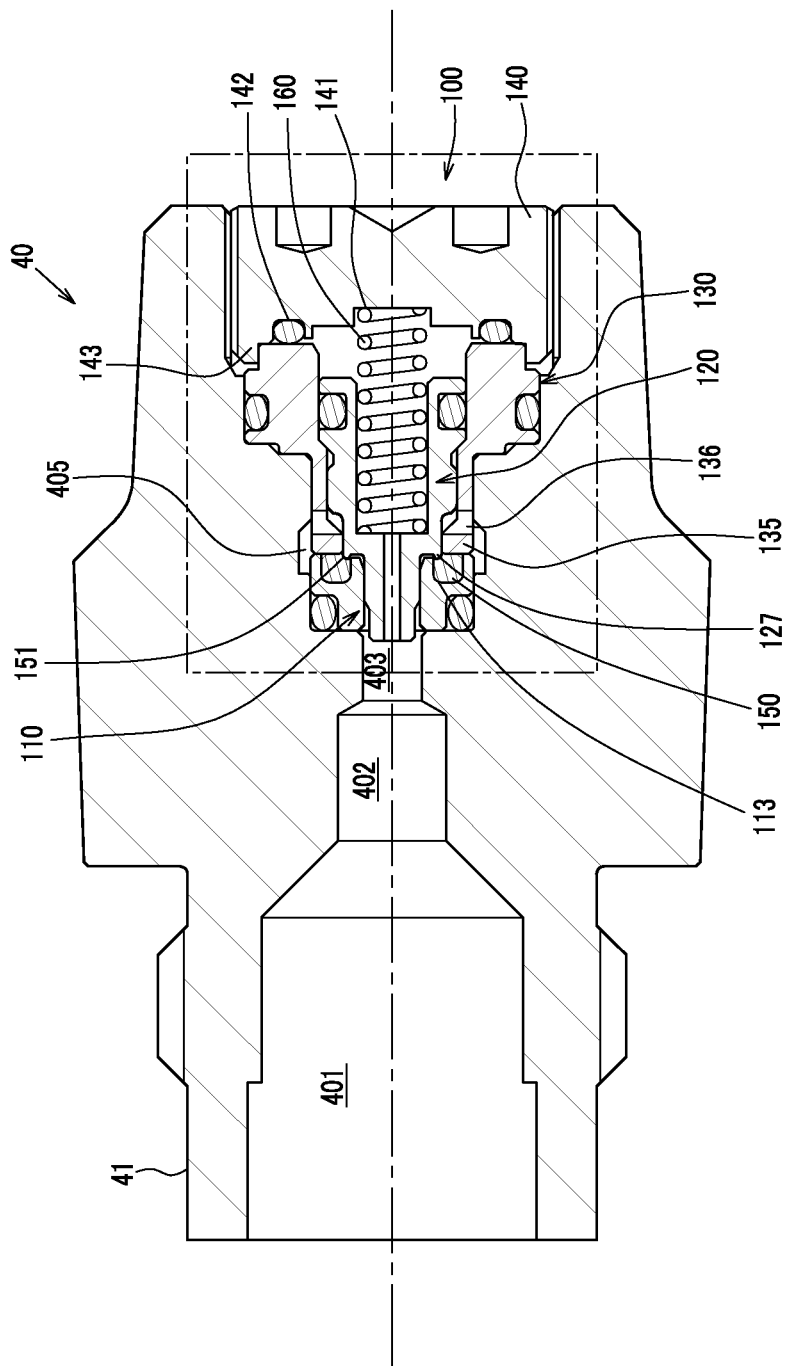
FIG. 3 is an enlarged cross-sectional view of the Residual pressure Valve mechanism.
Figure 4:
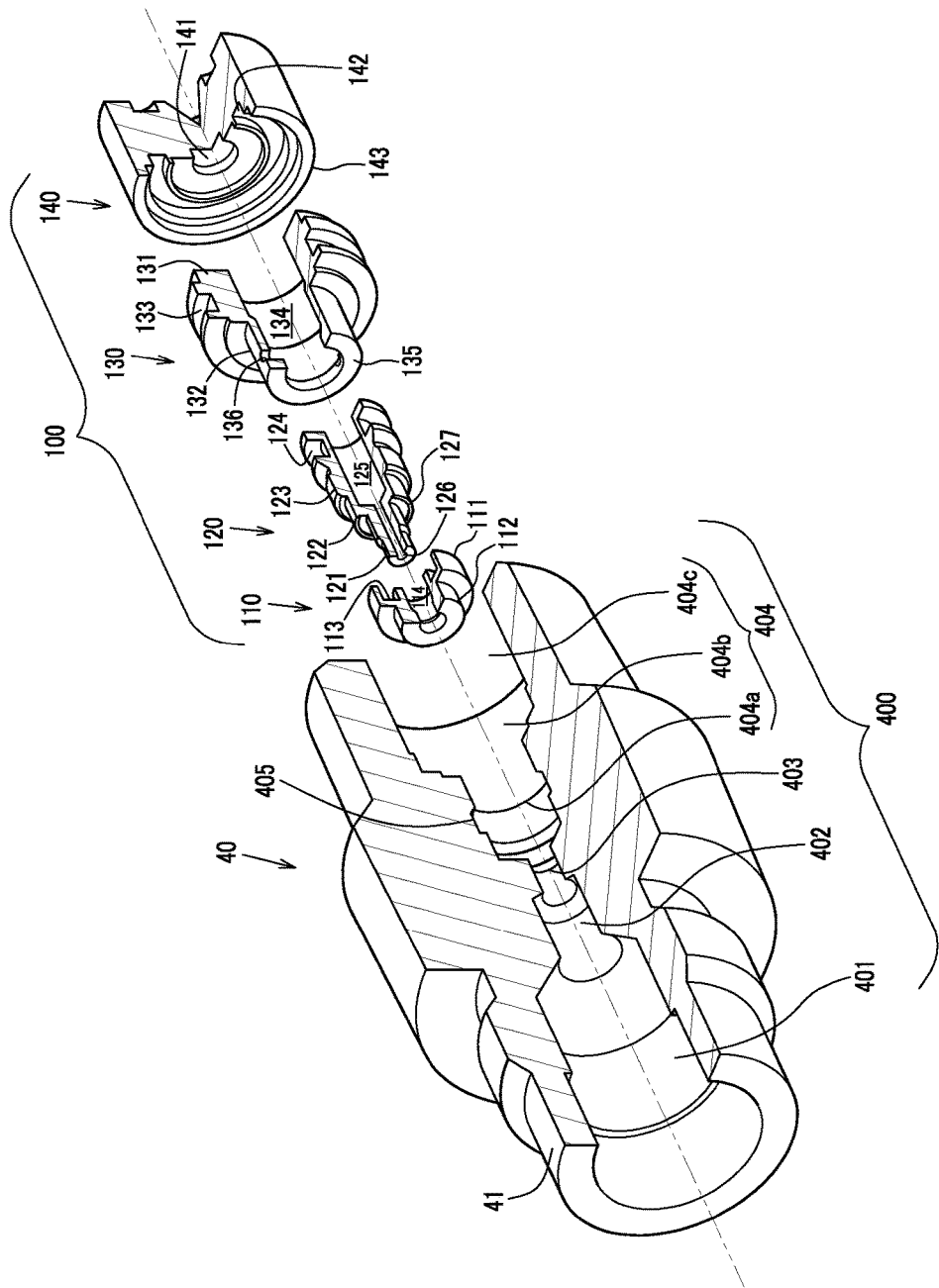
FIG. 4 is an exploded isometric view of the Residual pressure Valve mechanism.

FIG. 1 is a cross-sectional view of the Cylinder Valve 1. FIG. 2 shows a cross-section of a Residual pressure Valve mechanism 100 in the Cylinder Valve 1. FIG. 3 is an enlarged cross-sectional view of the Residual pressure Valve mechanism 100. FIG. 4 is an exploded isometric view of the Residual pressure Valve mechanism 100. FIGS. 5(A) and 5(B) illustrate the Residual pressure Valve mechanism 100.

In more detail, FIG. 5(A) is a cross-sectional view of the Residual pressure Valve mechanism 100 in the case where a valve 120 is at a valve close position, and FIG. 5(B) is a cross-sectional view of the Residual pressure Valve mechanism 100 in the case where the valve 120 is at a valve open position.

As shown in FIG. 1, the Cylinder Valve 1 is a seal system Cylinder Valve which, when being attached to a cylinder container (not shown), restricts a flow of gas G to supply the gas G or fill the cylinder with the gas G. The Cylinder Valve 1 includes a lengthy housing 31, a cylinder attachment portion 32 that is attached to a bottom part of the housing 31 and is attachable to the cylinder container as a result of being engaged with an attachment portion (not shown) provided in a top part of the cylinder container, an outlet 40 protruding laterally from a middle part of the housing 31, and a shut-off valve mechanism 50 attached to a top part of the housing 31.

Components in the shut-off valve mechanism 50 face each other with an O-ring being provided at an appropriate position therebetween, and the shut-off valve mechanism 50 and the housing 31 also face each other with an O-ring being provided at an appropriate position therebetween. The O-rings are not shown and will not be described in detail.

The housing 31 accommodates a shut-off valve attachment recessed portion 61 that is provided in a top part thereof and allows the shut-off valve mechanism 50 to be attached thereto, a primary-side flow path 62 extending from a bottom end of the shut-off valve attachment recessed portion 61 to a bottom end of the cylinder attachment portion 32, and a secondary-side flow path 63 extending from the bottom end of the shut-off valve attachment recessed portion 61 to a tip of the outlet 40.

The shut-off valve attachment recessed portion 61 includes a working chamber 61a, which is a generally cylindrical recessed portion that is opened upward, and a shut-off valve chamber 61b provided below the working chamber 61b and having a slightly smaller diameter than that of the working chamber 61a. A bottom surface of the working chamber 61b is in communication with a top end of the primary-side flow path 62. A top end opening 62a of the primary-side flow path 62 is formed in the bottom surface of the working chamber 61b. An open valve seat 62b protruding upward is formed along an edge of the top end opening 62a.

The housing 31 also accommodates a flow path 60 including the shut-off valve chamber 61b, the primary-side flow path 62 and the secondary-side flow path 63. The flow path 60 extends from the bottom end of the cylinder attachment portion 32 to the tip of the outlet 40.

The outlet 40 accommodates an in-outlet secondary-side flow path 400, which is formed in the outlet 40 and is a part of the secondary-side flow path 63. The in-outlet secondary-side flow path 400 and the outlet 40 will be described later together with the Residual pressure Valve mechanism 100.

The shut-off valve mechanism 50 attached in the shut-off valve chamber 61b includes a Handwheel 51, a ground nut 52, a spindle 53, an intermediate transmission member 54, and a shut-off member 55 attached to a bottom surface of the intermediate transmission member 54.

The Handwheel 51 has, as seen in a plan view, a generally circular cloud shape having a wavy outer edge protruding at eight positions, and includes an engageable portion 51a allowing a to-be-engaged portion 53a in a top part of the spindle 53 to be engaged therewith.

The ground nut 52 includes a head nut portion 52a and a Male thread portion 52b engageable with a Female thread formed in an inner surface of the working chamber 61a of the shut-off valve attachment recessed portion 61. The ground nut 52 is hollow and generally cylindrical.

The spindle 53 includes the to-be-engaged portion 53a engageable with the engageable portion 51a of the Handwheel 51, and an engageable recessed portion 53b engageable with a spindle engageable recessed portion 54a of the intermediate transmission member 54. The to-be-engaged portion 53a is provided in the top part of the spindle 53, and the engageable recessed portion 53b is provided in a bottom part of the spindle 53.

The intermediate transmission member 54 is generally cylindrical, and includes the spindle engageable recessed portion 54a allowing the engageable recessed portion 53b of the spindle 53 to be engaged therewith, and a shut-off member engageable recessed portion 54b allowing the shut-off member 55 to be engaged therewith. The spindle engageable recessed portion 54a is provided in a top part of the intermediate transmission member 54, and the shut-off member engageable recessed portion 54b is provided in a bottom part of the intermediate transmission member 54.

The shut-off member 55 is an elastic member that is circular as seen in a plan view, and is engageable with the shut-off member engageable recessed portion 54b of the intermediate transmission member 54. The shut-off member 55 allows the open valve seat 62b to eat thereinto in a valve close state.

The shut-off valve mechanism 50, including the Handwheel 51, the ground nut 52, the spindle 53, the intermediate transmission member 54 and the shut-off member 55, is assembled as follows. The shut-off member engageable recessed portion 54b of the intermediate transmission member 54 is put into engagement with the shut-off member 55, and the engageable recessed portion 53b of the spindle 53 is put into engagement with the spindle engageable recessed portion 54a of the intermediate transmission member 54. The ground nut 52 is attached to the spindle 53, and the Male thread portion 52b of the ground nut 52 is put into engagement with the Female thread of the shut-off valve attachment recessed portion 61 to attach the around nut 52 to the shut-off valve attachment recessed portion 61. The to-be-engaged portion 53a of the spindle 53 is put into engagement with the engageable portion 51a of the Handwheel 51. Thus, the shut-off valve mechanism 50 is assembled.

The Handwheel 51 of the shut-off valve mechanism 50 thus structured is screwed in a tightening direction to press the intermediate transmission member 54 downward via the spindle 53. In this process, the open valve seat 62b formed along the top end opening 62a eats into the shut-off member 55 engaged with the shut-off member engageable recessed portion 54b of the intermediate transmission member 54, and thus the shut-off member 55 seals the top end opening 62a. This state is referred to as a "sealed state".

By contrast, when the Handwheel 51 is rotated in a releasing direction to pull the spindle 53, the intermediate transmission member 54 is moved upward via the spindle 53. Therefore, the top end opening 62*a* is opened to allow the primary-side flow path 62 and the second-side flow path 63 to be in communication with each other via the shut-off valve chamber 61*b*. Thus, the flow path 60 allows a fluid to flow therein. This state is referred to as an "open state".

Now, the outlet 40, and the in-outlet secondary-side flow path 400 formed in the outlet 40 and forming a part of the secondary-side flow path 63 of the flow path 60, will be described with reference to FIG. 2.

The outlet 40 has a generally cylindrical shape extending in a lateral direction, and includes a connection permission portion 41 allowing connection of a filling jig (not shown) and a tool (not shown) using gas G. The in-outlet secondary-side flow path 400 extends throughout the outlet 40 in the lateral direction.

In the following description, a part of the secondary-side flow path 63 that is located in the housing 31 is referred to as an in-housing secondary-side flow path 64, and a part of the secondary-side flow path 63 that is located in the outlet 40 is referred to as the in-outlet secondary-side flow path 400. The in-housing secondary-side flow path 64 and the in-outlet secondary-side flow path 400 form the secondary-side flow path 63, which is T shaped as seen in a plan view.

The in-outlet secondary-side flow path 400 includes, sequentially from the side of the connection permission portion 41, an insertion space 401 allowing the filling jig and the like described above to be inserted thereto, a small-diameter space 402 having a smaller diameter than that of the insertion space 401, a small-diameter coupling space 403 coupling the small-diameter space 402 and a Residual pressure Valve mechanism insertion space 404 described later to each other, and the Residual pressure Valve mechanism insertion space 404 allowing the Residual pressure Valve mechanism 100 described later to be inserted thereto. The insertion space 401, the small-diameter space 402, the small-diameter coupling space 403 and the Residual pressure Valve mechanism insertion space 404 are in communication with each other in an axial direction of the outlet 40. The in-outlet secondary-side flow path 400 also includes a circular flow path 405, which is in communication with an end of the in-housing secondary-side flow path 64 and is formed diametrically outer to the Residual pressure Valve mechanism insertion space 404.

The Residual pressure Valve mechanism insertion space 404 includes a tip-side insertion space 404*a* allowing a tip of the Residual pressure Valve mechanism 100 to be inserted thereto, a large-diameter insertion space 404*b* having a larger diameter than that of the tip-side insertion space 404*a*, and an engageable space 404*c* allowing a valve lid 140 at a rear end of the Residual pressure Valve mechanism 100 to be engaged therewith. The circular flow path 405 is formed diametrically outer to the tip-side insertion space 404*a* at an intermediate position in the tip-side insertion space 404*a*, such that a space inner to the circular flow path 405 is integral with the tip-side insertion space 404*a* of the Residual pressure Valve mechanism insertion space 404.

The Residual pressure Valve mechanism 100 is attached in the Residual pressure Valve mechanism insertion space 404 of the in-outlet secondary-side flow path 400 and has a residual pressure retaining function in a valve open state of the shut-off valve mechanism 50. The Residual pressure Valve mechanism 100 will be described with reference to FIG. 3.

The Residual pressure Valve mechanism 100 includes a seal seat 110, a valve 120, a valve box 130, the valve lid 140, O-rings 150 and a coil spring 160. In FIG. 3, the left side is the front side (tip side) in an axial direction, and the right side is the rear side (rear end side) in the axial direction.

The seal seat 110 includes a ring-shaped main body 111 having substantially the same diameter as that of the tip-side insertion space 404*a* of the Residual pressure Valve mechanism insertion space 404, and a forward protrusion portion 112 protruding forward from an inner surface of the ring-shaped main body 111. A rear surface of the ring-shaped main body 111 has an O-ring groove 113 allowing the O-ring 150 to be fitted thereto.

The seal seat 110 also has a through-hole 114 having substantially the same diameter as that of the coupling space 403 allowing a tip protrusion portion 121 of the valve 120 (described later) to be inserted thereto. The O-ring groove 113 is a recessed portion that has a depth and a width which are each slightly smaller than the diameter of the O-ring 150, and is opened rearward.

The valve 120 includes the tip protrusion portion 121 provided in a front part of the valve 120 and protruding forward, a cylindrical main body 122 provided rear to the tip protrusion portion 121 and having a larger diameter than that of the tip protrusion portion 121, and a large diameter portion 123 having a larger diameter than that of the cylindrical main body 122 and having an engageable groove 124 in an outer circumferential surface thereof. The engageable groove 124 allows the O-ring 150 to be engaged therewith. The valve 120 is generally cylindrical and has a diameter that becomes larger step by step. The cylindrical main body 122 and the large diameter portion 123 have a spring space 125 therein. The spring space 125 is opened rearward and allows the coil spring 160 to be fitted thereto. The tip protrusion portion 121 has a communication hole 126 therein, which is in communication with the spring space 125.

A front surface of the cylindrical main body 122 is provided with a forward convex portion 127 protruding forward from an outer circumferential edge of the cylindrical main body 122.

The valve box 130 includes a ring-shaped main body 131 having substantially the same diameter as that of the large-diameter insertion space 404*b*, and a forward protrusion portion 132 protruding forward from an inner surface of the ring-shaped main body 131. An outer circumferential surface of the ring-shaped main body 131 has an O-ring groove 133 allowing the O-ring 150 to be attached thereto. The ring-shaped main body 131 also has an inner space 134 allowing the valve 120 to be assembled thereto.

The forward protrusion portion 132 has substantially the same diameter as that of the tip-side insertion space 404*a*, and is provided with a pressing portion 135 at a tip thereof. The pressing portion 135 presses forward a part of the O-ring 150 fitted into the O-ring groove 113. The part of the O-ring 150 that is pressed forward is a portion that is about ⅔ of the O-ring 150 on a rear and diametrically outer side thereof. The forward protrusion portion 132 has a plurality of diametrical-direction through-holes 136 formed in a circumferential direction thereof. The diametrical-direction through-holes 136 allow a space outer to the forward protrusion portion 132 and the inner space 134 to be in communication with each other in the diametrical direction.

The valve lid 140 has a cylindrical shape and is fitted into the engageable space 404*c*. An outer circumferential surface (not shown) of the valve lid 140 has a thread engageable with a screw groove formed in an inner surface of the engageable space 404*c*. The valve lid 140 includes a spring recessed portion 141, an O-ring groove 142, and a restriction ring 143. The spring recessed portion 141 is provided at the center on the front side of the valve lid 140, and restricts the position of the coil spring 160. The O-ring groove 142 is provided diametrically outer to the spring recessed portion 141, is opened forward, and allows the O-ring 150 to be fitted thereto. The restriction ring 143 is provided at an outermost side, and restricts an rear end of the ring-shaped main body 131 of the valve box 130.

The coil spring 160 is insertable into the spring space 125, and is longer than the spring space 125.

The seal seat 110, the valve 120, the valve box 130, the valve lid 140, the O-rings 150, and the coil spring 160 provided in such a structure are assembled to the Residual pressure Valve mechanism insertion space 404 of the in-outlet secondary-side flow path 400 to provide the Residual pressure Valve mechanism 100.

This will be described in more detail. The seal seat 110 having the O-ring 150 assembled to the O-ring groove 113 is fitted into a tip of the tip-side insertion space 404a of the Residual pressure Valve mechanism insertion space 404. In this process, the O-ring 150 is attached in a space enclosed by an inner surface of the tip-side insertion space 404a, the forward protrusion portion 112 of the seal seat 110 and the ring-shaped main body 111 of the seal seat 110. In this state, the ring-shaped main body 111 having the O-ring groove 113 retaining the O-ring 150 protrudes onto a shortest flow path for the gas G that connects the circular flow path 405 and the coupling space 405 with each other in a straight manner.

The O-ring 150 is assembled to the O-ring groove 133, and the valve 120 having the O-ring 150 assembled to the engageable groove 124 is inserted into the inner space 134 of the valve box 130.

The valve box 130 having the valve 120 inserted thereto is inserted such that the forward protrusion portion 132 is located in the tip-side insertion space 404a and such that the ring-shaped main body 131 is in the large-diameter insertion space 404b.

In this process, the tip protrusion portion 121 of the valve 120 assembled so as to protrude to a position forward to the pressing portion 135 extends through the through-hole 114 of the seal seat 110. The rear and diametrically outer portion of the O-ring 150 assembled to the O-ring groove 113 of the seal seat 110 contacts the pressing portion 135 and is pressed forward by the pressing portion 135.

In this state, the coil spring 160 is inserted into the spring space 125 of the valve 120, and a rear end of the coil spring 160 is fitted into the spring recessed portion 141. The valve lid 140 having the O-ring 150 assembled to the O-ring groove 142 is put into engagement with the engageable space 404c. Thus, the Residual pressure Valve mechanism 100 is assembled.

In this state, the rear end of the ring-shaped main body 131 of the valve box 130 is positionally restricted by the restriction ring 143 of the valve lid 140, the valve box 130 fitted into the large-diameter insertion space 404b is held by the valve lid 140, and the seal seat 110 is pressed forward by the pressing portion 135 of the valve box 130. In the Residual pressure Valve mechanism insertion space 404, the seal seat 110, the valve box 130, and the valve lid 140 are positionally secured.

In the Residual pressure Valve mechanism 100 assembled in this manner, the valve 120 assembled to the inner space 134 of the valve box 130 is urged forward at a predetermined urging force by the coil spring 160, which uses the valve lid 140, engaged with the engageable space 404c, as a reaction force.

The O-ring 150, which has a circular cross-section, is assembled to the O-ring groove 133, of the valve box 130, which is recessed and opened rearward. Therefore, a front portion, a diametrically inner portion and a diametrically outer portion of the circular cross-section are restricted by the O-ring groove 13. A rear portion of the circular cross-section is not restricted by the O-ring groove 133, but about ⅔ of the rear portion on the diametrically outer side is restricted by the pressing portion 135 of the valve box 130. Therefore, a rear and diametrically inner portion of the circular cross-section of the O-ring 150 assembled to the O-ring groove 133 is not restricted, and this portion acts as a contact permission portion 151 allowing the forward convex portion 127 of the valve 120 to be in contact therewith (see FIGS. 5(A) and 5(B)).

The O-ring 150 assembled to the engageable groove 124 contacts an inner surface of the valve box 130 in a diametrical direction, the O-ring 150 assembled to the O-ring groove 133 contacts an inner surface of the large-diameter insertion space 404b in the diametrical direction, and the O-ring 150 assembled to the O-ring groove 142 contacts a rear surface of the valve box 130 in an axial direction. Therefore, a space outer to the valve 120 and a space inner to the valve 120 are sealed and separated from each other.

In this manner, the Residual pressure Valve mechanism 100 is assembled to the Residual pressure Valve mechanism insertion space 404, while being sealed with certainty. In the above-described sealed state provided by the shut-off valve mechanism 50, the Residual pressure Valve mechanism 100 is urged forward by the coil spring 160. Therefore, as shown in FIG. 3, the valve 120 is at a front position, namely, at the valve close position, and the forward convex portion 127 eats into the contact permission portion 151 to realize the valve close state.

In the valve close state, the in-outlet secondary-side flow path 400 and the in-housing secondary-side flow path 64 are separated from each other by the Residual pressure Valve mechanism 100.

In this valve close state, in order to fill the cylinder container with gas G, the gas G cannot be supplied to the in-outlet secondary-side flow path 400. Therefore, a filing jig (not shown) is inserted into the insertion space 401. The valve 120 is pressed rearward against an urging force of the coil spring 160 to put the cylinder container into communication with the in-housing secondary-side flow path 64 via the small-diameter space 402, the coupling space 403, the Residual pressure Valve mechanism insertion space 404 and the circular flow path 405, and the shut-off valve mechanism 50 is put to the valve open position. Thus, the cylinder container is also put into communication with the shut-off valve attachment recessed portion 61 and the primary-side flow path 62. In this manner, the cylinder container is filled with the gas G.

By contrast, the gas G filling the cylinder container is released as follows. First, the shut-off valve mechanism 50 is opened to cause the gas G to flow to the circular flow path 405 via the primary-side flow path 62, the shut-off valve attachment recessed portion 61 and the in-housing secondary-side flow path 64. The gas G reaching the circular flow path 405 still retains the pressure thereof when being provided to fill the cylinder container, and therefore, flows to the inner space 134 of the valve box 130 via the diametrical-direction through-holes 136 of the valve box 130.

A pressure difference, provided by the gas G reaching the inner space 134, between the pressure outside the valve 120 and the pressure inside the valve 120 causes the valve 120 to move rearward against the urging force of the coil spring 160. As a result, the forward convex portion 127 and the contact permission portion 151 are released from the contact state. As shown in FIG. 5(B), the circular flow path 405 and the small-diameter space 402 are put into communication with each other via the diametrical-direction through-holes 136. Thus, the gas G is caused to flow to the tool attached in the insertion space 401.

In this state, the O-ring 150 assembled to the O-ring groove 113 of the seal seat 110 secured to the outlet 40 is restricted except for the contact permission portion 151; namely, is covered with the O-ring groove 113 and the pressing portion 135. Therefore, although the gas G flows in the vicinity of the O-ring 150 assembled to the valve box 130, the gas G flow noise is prevented from being caused by the flow of the gas G.

When the amount of the gas G remaining in the cylinder container is decreased by the release of the gas G, the pressure inside the cylinder container is decreased. The decrease in the pressure inside the cylinder container causes the pressure of the flowing gas G to decrease. When the pressure of the gas G becomes lower than the urging force of the coil spring 160, the valve 120 is moved forward by the urging force of the coil spring 160 to the valve close position. As a result, the Residual pressure Valve mechanism 100 is put into the valve close state. Therefore, the gas G remains in the cylinder container at a pressure lower than the urging force of the coil spring 160.

As described above, the Residual pressure Valve mechanism 100 prevents the gas G, flowing in the flow path 60 in the releasing direction, from flowing in an unintended direction. The Cylinder Valve 1 includes the Residual pressure Valve mechanism 100 located in the Residual pressure Valve mechanism insertion space 404. In more detail, the Cylinder Valve 1 includes, in the Residual pressure Valve mechanism insertion space 404, the valve 120 that is located so as to freely advance and or retract to the valve close position or the valve open position and retracts toward the valve open position by a pressure of the gas G flowing in the flow path 60, the coil spring 160 urging the valve 120 in the forward direction from the valve open position toward the valve close position, the forward convex portion 127 located at a tip of the valve 120 located at the valve close position, the elastic O-rings 150 contacting the forward convex portion 127 in a direction in which the valve 120 advances and retracts to provide sealing, and the seal seat 110 and the pressing portion 135 retaining the O-rings 150. Therefore, the Cylinder Valve 1 switches a gas G sealing state to a gas G releasing state or vice versa with certainty by the switching of the shut-off valve mechanism 50 and the Residual pressure Valve mechanism 100.

The gas G flow noise is caused by the O-ring, provided on a valve located at the valve open position in a conventional Residual pressure Valve mechanism, vibrating by the flow of the gas or coming off from the predetermined position. In the above-described Residual pressure Valve mechanism 100, the contact permission portion 151 of the O-ring 150 allows the forward convex portion 127 to be in contact therewith. The seal seat 110 and the pressing portion 135 retaining, while exposing at least, the contact permission portion 151 of the O-ring 150 are secured to the outlet 40. Namely, the O-ring 150 is secured to the outlet 40, which is secured to the valve 120, which is movable. Therefore, the O-ring 150 retained by the seal seat 110 is prevented from vibrating by the flow of the gas G to cause resonance or is prevented from coming off by blow-down. Thus, the gas G flow noise is prevented from being caused.

Regarding the O-ring 150, three portions thereof, namely, the diametrically inner portion, the diametrically outer portion and the front portion of the circular cross-section thereof are restricted by the O-ring groove 113, and the rearward and diametrically outer portion of the circular cross-section is restricted by the pressing portion 135. Namely, the four portions of the O-ring are restricted by the seal seat 110 and the pressing portion 135, and only the contact permission portion 151 of the O-ring 150 is not restricted. Therefore, the O-ring 150 assembled to the O-ring groove 113 of the seal seat 110 is prevented from vibrating by the flow of the gas G to cause resonance or is prevented from coming off by blow-down. Thus, the gas G flow noise is prevented with more certainty from being caused.

A rear portion of the circular cross-section of the O-ring 150 except for the contact permission portion 151 in contact with the forward convex portion 127 is pressed by the pressing portion 135. Namely, a pre-stress acts on the O-ring 150, which is elastic, by the pressing force of the pressing portion 135. Therefore, even if a force acts, by the flow of the gas G, in an opposite direction to the pressing direction of the pressing portion 135, the O-ring 150 assembled to the O-ring groove 113 of the seal seat 110 is prevented from vibrating by the flow of the gas G to cause resonance or is prevented from coming off by blow-down. Thus, the gas G flow noise is prevented with more certainty from being caused.

The ring-shaped main body 111, which is a part of the seal seat 110 and has the O-ring groove 113 retaining the O-ring 150, is located so as to protrude onto the shortest flow path for the gas G of the secondary-side flow path 63 including the in-housing secondary-side flow path 64 and the in-outlet secondary-side flow path 400. Therefore, the gas G flows so as to bypass the seal seat 110. Thus, the flow noise is prevented with more certainty from being caused.

In the secondary-side flow path 63 including the in-outlet secondary-side flow path 400 located in the outlet 40 and the in-housing secondary-side flow path 64 that are in communication with each other, the Residual pressure Valve mechanism insertion space 404 is in the vicinity of the insertion space 401 into which the filling jig or the tool are inserted. In the state where a Residual pressure Valve mechanism is attached in the Residual pressure Valve mechanism insertion space 404, there may be an undesirable possibility that the gas G flow noise may be heard outside well. However, the Residual pressure Valve mechanism 100 having the above-described structure prevents the gas G flow noise, and thus the flow noise is not heard outside.

The coil spring 160 has a spring strength that is sufficient to move the valve 120 to the valve close position against a predetermined pressure of the gas G residual in the cylinder container when the gas G is released through the flow path 60. Therefore, the gas G provided to fill the cylinder container is not entirely released, and the gas G of predetermined pressure is left in the cylinder container. Since the gas G of the predetermined pressure remains, the predetermined pressure acts in the cylinder container by the residual gas G. This prevents an unintended flow of the gas G into the cylinder container.

The fluid according to the present invention corresponds to the gas G in the above-described embodiment; and similarly, the Gas Cylinder corresponds to the cylinder container;
the valve main body corresponds to the housing 31;
the container attachment portion corresponds to the cylinder attachment portion 32;
the fluid inlet/outlet corresponds to the in-outlet secondary-side flow path 400;
the open/close valve corresponds to the shut-off valve mechanism 50;

the flow direction restriction valve mechanism corresponds to the Residual pressure Valve mechanism 100;

the restriction valve attachment space corresponds to the Residual pressure Valve mechanism insertion space 404;

the flow direction restriction valve corresponds to the valve 120;

the urging member corresponds to the;

the tip contact portion corresponds to the forward convex portion 127;

the sealing member and the elastic ring each correspond to the O-ring 150;

the sealing member retaining portion corresponds to the seal seat 110 and the pressing portion 135;

the pressing member corresponds to the pressing portion 135; and the secondary-side flow path corresponds to the secondary-side flow path 63 including the in-housing secondary-side flow path 64 and the in-outlet secondary-side flow path 400.

However, the present invention is not limited to the above-described embodiment, and may be carried out in any of many embodiments.

For example, the fluid is described above as a gas, but alternatively may be a fluid or a gel.

Figure 6:
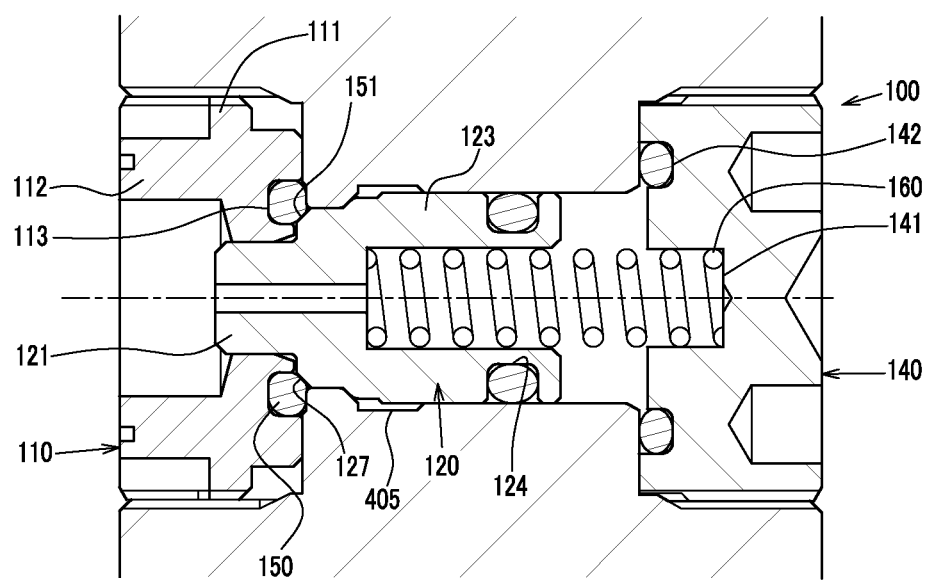
FIG. 6 is an enlarged cross-sectional view of a Residual pressure Valve mechanism in another embodiment.

In the above description, the seal seat 110 having the O-ring groove 113 to which the O-ring 150 is assembled is assembled to the outlet 40. Alternatively, as shown in FIG. 6, the O-ring 150 may be assembled to a member forming the small-diameter space 402, and a rear and diametrically outer portion of the O-ring 150 may be restricted by a part of the outlet 40 while the contact permission portion 151 may be exposed. In FIG. 6, elements having the same functions as those of the elements shown in FIG. 1 through FIGS. 5(A) and 5(B) bear the same reference signs therewith and descriptions thereof will be omitted.

Figure 7:
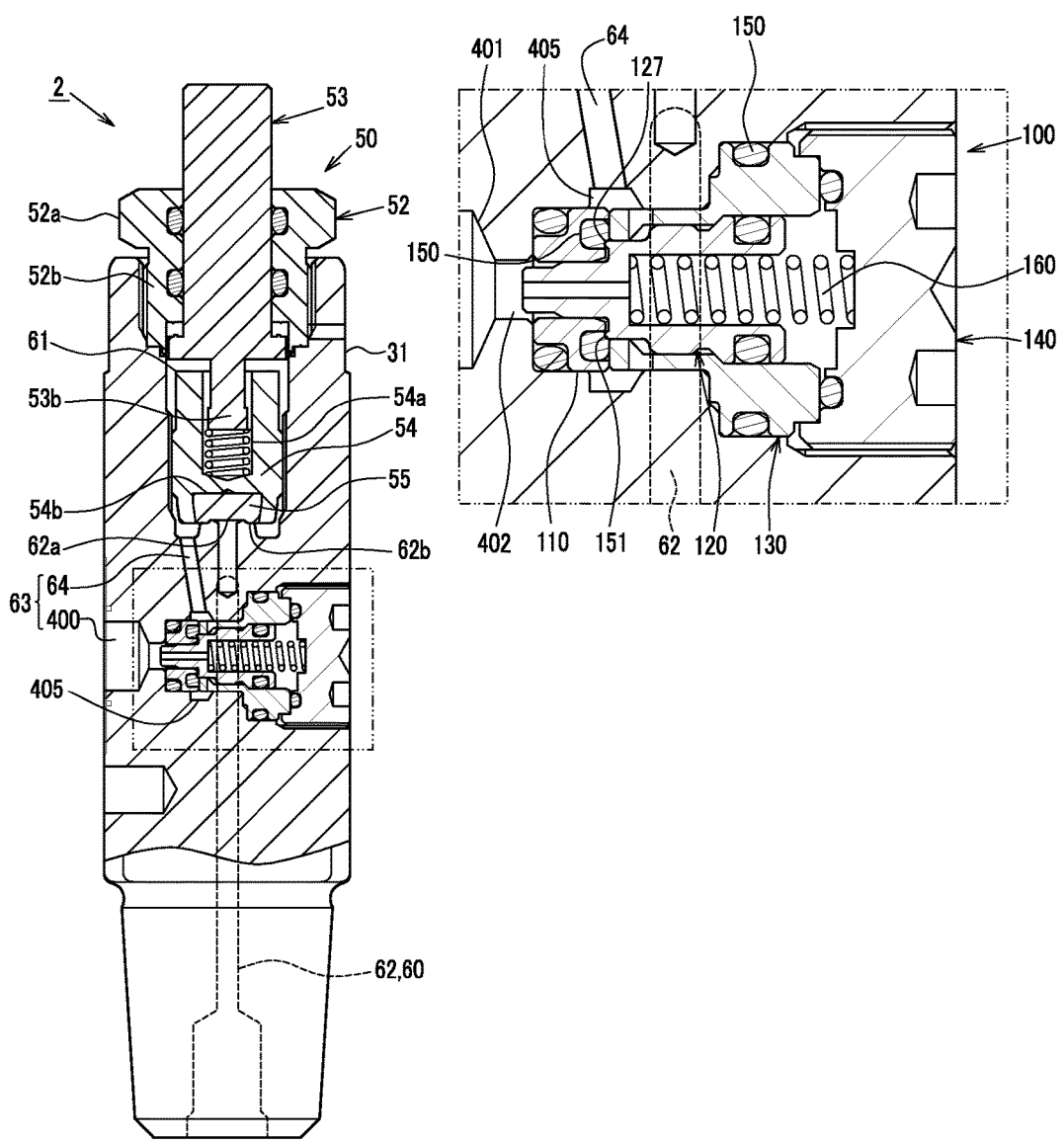
FIG. 7 is a cross-sectional view of a Cylinder Valve in still another embodiment.

In the above description, the Cylinder Valve 1 that is to be attached to the cylinder container as described above includes the Residual pressure Valve mechanism 100. Alternatively, as shown in FIG. 7, the Residual pressure Valve mechanism 100 may be included in a pin index valve 2.

The pin index valve 2 is attached to a medical cylinder container filled with oxygen gas and is widely used by medical institutions. The pin index valve 2 including the Residual pressure Valve mechanism 100 prevents the gas G flow noise, and therefore is usable even in a quiet environment, for example, during a surgery. In FIG. 7, elements having the same functions as those of the elements shown in FIG. 1 through FIGS. 5(A) and 5(B) bear the same reference signs therewith and descriptions thereof will be omitted.

In the above description, the Residual pressure Valve mechanism 100 is located in the Residual pressure Valve mechanism insertion space 404. Alternatively, a check valve mechanism or the like may be located in the Residual pressure Valve mechanism insertion space 404.

Instead of the O-rings 150, sealing and elastic members such as rubber seals, metal seals or the like that, for example, have an elliptical cross-section or are provided with a lip may be used.

REFERENCE SIGNS LIST

1 . . . Cylinder Valve
2 . . . Pin index valve
31 . . . Housing
32 . . . Cylinder attachment portion
50 . . . Shut-off valve mechanism
60 . . . Flow path
62 . . . Primary-side flow path
63 . . . Secondary-side flow path
64 . . . In-housing secondary-side flow path
100 . . . Residual pressure Valve mechanism
110 . . . Seal seat
120 . . . Valve
127 . . . Forward convex portion
135 . . . Pressing portion
150 . . . O-ring
151 . . . Contact permission portion
160 . . . Coil spring
400 . . . In-outlet secondary-side flow path
404 . . . Residual pressure Valve mechanism insertion space
G . . . Gas

The invention claimed is:

1. A cylinder valve, comprising:
a container attachment portion that attaches a valve to a gas cylinder that allows a fluid to be stored therein:
a fluid inlet/outlet that allows the fluid to flow to, and from, the valve;
a flow path that extends from the container attachment portion to the fluid inlet/outlet and being open at both of ends thereof to allow the fluid to flow therethrough; and
an open/close valve that switches an open state to a close state or from the close state to the open state at an intermediate portion of the flow path;
wherein:
a flow direction restriction valve mechanism that prevents the fluid, flowing in the flow path in a releasing direction, from flowing in an unintended direction is attached in a restriction valve attachment space formed in the flow path;
the flow direction restriction valve mechanism includes:
a flow direction restriction valve that is located in the restriction valve attachment space so as to freely advance or retract to a valve close position or a valve open position and retracts toward the valve open position by a pressure of the fluid flowing in the flow path;
an urging member that urges the flow direction restriction valve to advance from the valve open position toward the valve close position;
an elastic sealing member that directly contacts a tip contact portion, located at a tip of the flow direction restriction valve located at the valve close position, in a direction in which the flow direction restriction valve advances and retracts to provide sealing; and
a sealing member retaining portion that retains the sealing member while exposing at least a contact permission portion of the sealing member, the contact permission portion permitting the tip contact portion to be in contact therewith; and
the sealing member retaining portion is provided on the valve,
wherein the sealing member retaining portion includes a pressing member that directly contacts the sealing member and presses the sealing member in a contact direction in which the tip contact portion directly contacts the contact permission portion.

2. The cylinder valve according to claim 1, wherein:
the sealing member is formed of an elastic ring; and
the sealing member retaining portion restricts a diametrically inner portion, a diametrically outer portion, a portion opposite to a portion facing the tip contact portion, and a diametrically outer portion of the portion facing the tip contact portion of a cross-section of the elastic ring.

3. The cylinder valve according to claim 1, wherein:

the flow path includes a primary-side flow path from the container attachment portion to a valve chamber that accommodates the open/close valve and a secondary-side flow path from the valve chamber to the fluid inlet/outlet;

the restriction valve attachment space is provided in the secondary-side flow path; and the sealing member retaining portion that retains the sealing member is located so as to protrude onto a shortest flow path for the fluid flowing in the secondary-side flow path via the restriction valve attachment space.

4. The cylinder valve according to claim 1, wherein the urging member has a spring strength that is sufficient to move the flow direction restriction valve to the valve close position against a predetermined pressure of the fluid residual in the cylinder container when the fluid is released through the flow path.

\* \* \* \* \*